United States Patent [19]
Sato et al.

[11] 3,821,444
[45] June 28, 1974

[54] INHIBITION OF WARMED-OVER FLAVOR IN MEATS

[75] Inventors: Kunito Sato, Chicago; Gerald R. Hegarty, Elmhurst, both of Ill.

[73] Assignee: Armour and Company, Chicago, Ill.

[22] Filed: Aug. 4, 1972

[21] Appl. No.: 278,061

[52] U.S. Cl................................... 426/175, 426/371
[51] Int. Cl............................ A22c 18/00, A23l 1/22
[58] Field of Search............. 99/107, 108, 140, 159, 99/157, 109; 426/175, 371

[56] References Cited
UNITED STATES PATENTS
3,156,569   11/1964   Griffin et al. ........................ 99/140
3,186,853   6/1965   Meusel.............................. 99/108 X

*Primary Examiner*—Hyman Lord
*Attorney, Agent, or Firm*—Frank T. Barber; Carl C. Batz

[57] ABSTRACT

A method for inhibiting the development of warmed-over flavor in uncured meat where the meat is cooked, cooled and stored at above freezing temperature in the presence of certain gamma-pyrone compounds, after which the stored meat may be consumed cold or reheated without the development of objectionable warmed-over flavor.

11 Claims, No Drawings

INHIBITION OF WARMED-OVER FLAVOR IN MEATS

This invention relates to a method for avoiding the development of warmed-over flavor in meats and meat products.

BACKGROUND

It is characteristic of meat products that after they have been cooked and then stored for a period of time in a cool place they normally develop a flavor different from the flavor they have when first cooked. This flavor has come to be associated with meats which have been reheated and served a second time and has come to be known in the meat packing industry and among consumers as "warmed-over" flavor. The development of this characteristic flavor does not affect the nutritional qualities of the meat, but it does very substantially affect the palatability of the meat and the pleasure which may be derived either through odor or flavor of the meat as it is consumed. It is easy to tell when meat has this characteristic, warmed-over flavor, and one does not have to be an expert to tell when this flavor has developed.

The warmed-over flavor does not develop in raw meat but appears to start its development after cooking when the meat has been allowed to cool. It appears to develop best at refrigeration temperatures of 30° to 50°F. (−1.1° to 10°C.) particularly so at about 38°F. (3.3°C.) which is a normal refrigeration temperature. Warmed-over flavor can be detected after about 20 minutes or half an hour of storage, and comes to be well developed in 3 or 4 hours. Beef is especially affected by warmed-over flavor, and pork, veal and lamb are also affected. Poultry meat such as turkey and chicken and the like are very much affected. It has not been known what chemicals are involved in the development of warmed-over flavor, or what the mechanism of development may be.

Further, we have noted that the warmed-over flavor does not develop in the case of cured meats, and by "cured meats" we mean meats which have been treated with curing agents such as nitrates and nitrites and high concentrations of salts such as the polyphosphates. However, in using the term "uncured meats" we do not wish to exclude those meats which have been salted to taste or contain less than a small quantity, of the order of 2 or 3 percent, of salt, which meats are classed as "fresh" instead of "cured," and are capable of developing warmed-over flavor. We exclude only those meats which have been subjected to curing treatments using salts such as nitrites, nitrates and phosphates at relatively low levels of the order of 0.5 to 1 percent on a weight basis, and which would be sold as cured products.

Accordingly, it is an object of this invention to provide a method of treating and storing uncured meat which will prevent the development of warmed-over flavor and enable the cooked meat to be served in cold or reheated form but having more of the odor and flavor of freshly cooked meat. We are aware of the large amount of work that has been done in adding flavors to meat and that flavors have been added to meats both to improve the flavor of the meats and to mask unwanted flavors. In the present invention this is not our objective. We seek only to avoid the development of the undesirable warmed-over flavor but otherwise to leave the meat with its natural odor and flavor. It is, of cource, desirable, in our invention that if there be any incidental change in the natural flavor of the meat that it be a pleasant and not an unpleasant change.

We have found that warmed-over flavor in uncured meats is inhibited or avoided by the presence with the meat of certain gamma-pyrones. We can use any gamma-pyrone which has a hydroxyl group at its third or fifth position. Gamma-pyrones which we have found to be particularly effective are 3-hydroxy-2-methyl-4-pyrone, 3-hydroxy-2-ethyl-4-pyrone, and 5-hydroxy-2(hydroxymethyl)-4-pyrone.

In carrying out our method we simply mix the gamma-pyrone in dry form or in aqueous solution with fresh ground beef, for example, and cook the ground beef containing the gamma-pyrone in patties or otherwise. The cooked meat may then be cooled and stored in a refrigerator and then taken out and consumed cold or reheated to a temperature such as above 90°F. or 100° to 150°F. (37.8° to 65.6°C.) and consumed while warm. Benefit through avoidance of development of warmed-over flavor is obtained when the storage period is over about 20 minutes or half an hour with greater benefit being obtained when the storage is several hours. Further, the meat to which the gamma-pyrone has been added may be repeatedly stored and reheated while still avoiding the warmed-over flavor.

From our finding it appears that whatever chemical reaction or other mechanism was taking place to produce the unwanted warmed-over flavor, this was prevented or inhibited by the presence of our gamma-pyrones and that this effect stays with the meat through subsequent heating of the product and is not dissipated by anything that is normally done to meat such as heating or freezing.

In the case of meat which is sold in a body or chunk form such as a beef roast, the gamma-pyrone may conveniently be administered in the form of a solution, suitably an aqueous solution, with the solution being injected into the meat as by the use of a hollow needle. In such cases the gamma-pyrone comes to be absorbed into the tissues. Application of either the dry or solution form of the gamma-pyrone may be made directly to the outer surface of the meat piece.

In the event pieces of meat are assembled together in the form of a loaf the gamma-pyrone may be added to the pieces before they are pressed to form the loaf and the gamma-pyrone will be absorbed from the surface of the pieces. Other methods of application will include soaking the meat pieces in a bath of gamma-pyrone solution.

Our method is especially adaptable to beef and poultry meat, since these meats are particularly subject to the development of warmed-over flavor, but applies also to uncured pork, veal and lamb.

As was before stated we were seeking agents for inhibiting warmed-over flavor development without regard to any other improvement of flavor, and the gamma-pyrones add very little if any artificial flavor to the meat. They certainly add no objectionable flavor, the added flavor, if any, being a very pleasant one.

The amount of the gamma-pyrone used in our process varies principally according to the weight of the meat being treated, 0.05 percent dry weight of the gamma-pyrone based on the total weight of the meat being treated, is about a minimum and about 2 percent on the same basis is about a maximum so far as added flavor is concerned. Of course more than this could be used if added flavor is disregarded. Usually we prefer not to use more than 1 percent on a weight basis.

In practicing our improved method we prefer to add the gamma-pyrone to raw meat, because it is easier to get good distribution of the agent this way, but we do not believe the function of the agent in the inhibition of warmed-over flavor development is effective until the meat has been cooked and cooled. The gamma-pyrone agent may be added to the meat after it has been cooked as by injection or by any kind of mechanical manipulation which may be used to distribute the agent and which may be appropriate in the particular form of the cooked meat product employed.

After the treated meat has been cooked, it may be cooled and placed in a cooler or refrigerator for storage then removed after a time say from 20 minutes to half an hour or up to several hours or several days — any time up to the time of bacterial spoilage of the meat — and consumed cold, or reheated, and the warmed-over flavor will have been prevented or at least inhibited very substantially. By cooling the cooked meat we mean that we are reducing its temperature substantially below the cooking temperature, suitably below 50°F. (10°C.). Warmed-over flavor does not normally develop while the meat is held at or near the temperature at which it is first cooked, but once the factors are developed which produce warmed-over flavor they are not destroyed by heating even to cooking temperature. Also, we do not believe that warmed-over flavor is developed while meat is frozen. Therefore, in practicing our method the meat is cooled from its cooking temperature to below 50°F. (10°C.) and is stored at a temperature above freezing for a period in excess of 20 minutes, suitably as long as several days, in the presence of the gamma-pyrone agent to inhibit the warmed-over flavor.

The following Tables I, II and III contain data from the series of experiments which demonstrate the efficacy of different gamma-pyrone compounds for the inhibition of warmed-over flavor in different kinds of meat which are ordinarily subject to development of such flavor. In each experiment the gamma-pyrone was added to 10.0 grams of ground meat samples. The samples were cooked to 158°F. (70°C) and stored for 2 days at 4°C. (39.2°F.) and then tested for the presence of warmed-over flavor. Each sample containing the gamma-pyrone was accompanied by a corresponding sample which contained no gamma-pyrone and which served as a control.

Table IV contains data on a series of experiments demonstrating the effect of increasing the amount of the added gamma-pyrone. In this series of experiments the meat was prepared and handled in the same way as previously explained in connection with the tests reported in Tables I, II and III, and all conditions were held to be the same except for the increase in the amount of the additive. Reference to the results obtained show the additive to be effective for the purpose of preventive development of warmed-over flavor when contained in an amount up to at least as great as 2 percent but that at levels above about 1 percent there is detectable odor of the additive itself. However, the odor characteristic of gamma-pyrone is fragrant and can be tolerated.

In further explanation of Tables I, II, III and IV, the first column describes the kind of meat used and identifies the gamma-pyrone which was added. The second column gives the concentration of the gamma-pyrone compound in terms of the dry weight of the compound based on the weight of the meat treated. The third column gives the results of the subjective odor test, and the fourth column gives the value obtained in a TBA test. The TBA test is a chemical test which measures the extent of warmed-over flavor development in meats and is more particularly described in an article contained in volume 37, page 44 of the Journal of American Oil Chemists Society by B. G. Tarladgis, B. M. Watts, M. T. Younathan and L. R. Dugan, Jr., 1960, entitled "A Distillation Method for the Quantitative Determination of Malonaldehyde in Rancid Foods."

TABLE I

| TREATMENT | CONCENTRATION (%) | ODOR | TBA VALUE (ABSORBANCE |
| --- | --- | --- | --- |
| Control, pork | — | positive warmed-over flavor | 0.138 |
| Pork + 3-hydroxy-2-methyl-4-pyrone | 0.1 | no detectable warmed-over flavor | 0.030 |
| Control, lamb | — | positive warmed-over flavor | 0.223 |
| Lamb + 3-hydroxy-2-methyl-4-pyrone | 0.1 | no detectable warmed-over flavor | 0.066 |
| Control, white turkey meat | — | positive warmed-over flavor | 0.315 |
| White turkey meat + 3-hydroxy-2-methyl-4-pyrone | 0.1 | no detectable warmed-over flavor | 0.116 |
| Control, veal | — | strong warmed-over flavor | 0.332 |
| Veal + 3-hydroxy-2-methyl-4-pyrone | 0.1 | no detectable warmed-over flavor | 0.094 |

TABLE II

| TREATMENT | CONCENTRATION (%) | ODOR | TBA VALUE (ABSORBANCE) |
| --- | --- | --- | --- |
| Control, pork | — | positive warmed-over flavor | 0.306 |
| Pork + 3-hydroxy-2-ethyl-4-pyrone | 0.1 | no detectable warmed-over flavor | 0.007 |
| Control, beef | — | positive warmed-over flavor | 0.335 |
| Beef + 3-hydroxy-2-ethyl-4-pyrone | 0.1 | no detectable warmed-over flavor | 0.037 |
| Control, white turkey meat | — | positive warmed-over flavor | 0.532 |
| White turkey meat + 3-hydroxy-2-ethyl-4-pyrone | 0.1 | no detectable warmed-over flavor | 0.038 |
| Control, dark turkey meat | — | positive warmed-over flavor | 0.500 |
| Dark turkey meat + 3-hydroxy-2-ethyl-4-pyrone | 0.1 | no detectable warmed-over flavor | 0.072 |

TABLE III

| TREATMENT | CONCENTRATION (%) | ODOR | TBA VALUE (ABSORBANCE) |
| --- | --- | --- | --- |
| Control, pork | — | positive warmed-over flavor | 0.260 |
| Pork + 5-hydroxy-2-(hydroxymethyl)-4-pyrone | 0.1 | no detectable warmed-over flavor | 0.013 |
| Pork + 5-hydroxy-2-(hydroxymethyl)-4-pyrone | 0.05 | no detectable warmed-over flavor | 0.017 |
| Control, beef | — | positive warmed-over flavor | 0.311 |
| Beef + 5-hydroxy-2-(hydroxymethyl)-4-pyrone | 0.1 | no detectable warmed-over flavor | 0.037 |
| Control, white turkey meat | — | positive warmed-over flavor | 0.505 |
| White turkey meat + 5-hydroxy-2-(hydroxymethyl)-4-pyrone | 0.2 | no detectable warmed-over flavor | 0.024 |
| Control, dark turkey meat | — | positive warmed-over flavor | 0.395 |
| Dark turkey meat + 5-hydroxy-2-(hydroxymethyl)-4-pyrone | 0.2 | no detectable warmed-over flavor | 0.000 |

TABLE IV

| TREATMENT | CONCENTRATION (%) | ODOR | TBA VALUE (ABSORBANCE) |
| --- | --- | --- | --- |
| Control, beef | — | strong warmed-over flavor | 0.216 |
| Beef + 3-hydroxy-2-methyl-4-pyrone | 0.5 | no detectable warmed-over flavor slight fragrant odor of the additive | 0.028 |
| Beef + 3-hydroxy-2-methyl-4-pyrone | 1.0 | no detectable warmed-over flavor noticable fragrant odor of the additive | 0.044 |
| Beef + 3-hydroxy-2-methyl-4-pyrone | 1.5 | no detectable warmed-over flavor positive odor characteristic of the additive | 0.048 |
| Beef + 3-hydroxy-2-methyl-4-pyrone | 2.0 | no detectable warmed-over flavor strong odor characteristic of the additive | 0.031 |

While in the foregoing detailed description specific conditions have been given in the carrying out of our improved method and we have given numerous specific examples in which our improved method has been practiced, it is understood that many variations may be made in this method and that all such variations are to be deemed within the spirit of this description and within the scope of the appended claims.

We claim:

1. A method for inhibiting the development of warmed-over flavor in uncured cooked meats comprising adding to the uncured meat a gamma-pyrone having a hydroxyl group at its third or fifth position and in the amount of from 0.05 to 2 percent based on the weight of the meat and the dry weight of the gamma-pyrone, cooking the meat, cooling the meat to a temperature below 50°F. and storing the meat with said gamma-pyrone incorporated therein for at least 20 minutes at a temperature above the freezing point of the meat.

2. A method as set forth in claim 1 wherein the gamma-pyrone is added to the meat before it is cooked.

3. A method as set forth in claim 1 wherein the gamma-pyrone is added after the meat is cooked.

4. A method as set forth in claim 1 wherein said meat is ground and said gamma-pyrone is mixed with the ground meat.

5. A method as set forth in claim 1 wherein said gamma-pyrone is added in dry form to the meat.

6. A method as set forth in claim 1 wherein said gamma-pyrone is added in the form of an aqueous solution to the meat.

7. A method as set forth in claim 6 wherein said solution is injected into the meat.

8. A method as set forth in claim 1 wherein said gamma-pyrone is 3-hydroxy-2-methyl-4-pyrone.

9. A method as set forth in claim 1 wherein said gamma-pyrone is 3-hydroxy-2-ethyl-4-pyrone.

10. A method as set forth in claim 1 wherein said gamma-pyrone is 5-hydroxy-2-(hydroxymethyl)-4-pyrone.

11. A method as set forth in claim 1 wherein said stored meat is reheated to a temperature above 90°F.

* * * * *